United States Patent

[11] 3,622,835

[72] Inventor Norman W. Parker
Wheaton, Ill.
[21] Appl. No. 883,754
[22] Filed Dec. 10, 1969
[45] Patented Nov. 23, 1971
[73] Assignee Motorola, Inc.
Franklin Park, Ill.

[54] CURRENT-GENERATING CIRCUIT
10 Claims, 2 Drawing Figs.

[52] U.S. Cl. .......... 315/13, 315/27
[51] Int. Cl. .......... H01j 29/50
[50] Field of Search .......... 315/13, 27 GD, 27 XY, 31 TV, 27

[56] References Cited
UNITED STATES PATENTS
3,444,422 5/1969 Wolber .......... 315/27
3,441,958 4/1969 Korver .......... 315/27
3,504,211 3/1970 Takemoto .......... 315/31

*Primary Examiner*—Rodney D. Bennett, Jr.
*Assistant Examiner*—N. Moskowitz
*Attorney*—Mueller & Aichele

ABSTRACT: A deflection system for use with a color television multibeam cathode-ray tube utilizes a toroid deflection yoke with the distribution of the vertical and horizontal deflection windings being such as to provide a uniform deflection field within the toroid. An additional set of four series-connected, oppositely wound correction windings are wound on different quadrants of the toroid yoke; and a correction current is applied to the correction windings in the form of a current corresponding to the horizontal deflection signal modulated by the vertical deflection signal for correcting misconvergence of the beams.

INVENTOR.
NORMAN W. PARKER

BY Mueller, Aichele & Rauner

ATTORNEYS.

CURRENT-GENERATING CIRCUIT

BACKGROUND OF THE INVENTION

In a color-television system using a three-beam shadow-mask cathode-ray tube it is desirable to provide a uniform field or anastigmatic deflection yoke to reduce beam distortion and beam landing problems. By utilizing a toroid yoke and by winding the horizontal and vertical deflection windings on the yoke in a basic sine or cosine distribution, it is possible to obtain a substantially uniform deflection field within the opening of the yoke toroid. The use of an anastigmatic yoke of this type makes it possible to converge the three beams along the vertical and horizontal axes of the picture tube face or the shadow mask, but the corners of the raster are not converged because the three beams pass through the toroid at different locations, and therefore are subjected to different deflection fields, with the locus of the beam coincidence being close to the raster center.

As a consequence, it is desirable to provide a means for correcting for these convergence errors of the beams at points other than the vertical and horizontal axis of the raster. With conventional saddle yoke predeflection-convergence systems, static and dynamic convergence of the beams is effected at a point in the path of the travel of the beams prior to the point at which the beams are subjected to the deflection fields. This results in shifts of the beam landings; so that it has been necessary to provide a relatively wide guard band on the shadow mask of the tube in order to maintain the desired purity of the reproduced color image. In addition, a substantial blue beam "droop" results from the use of such predeflection convergence corrections.

To provide for convergence correction at the center point of the beam deflection in order to eliminate this problem of a shift in the beam landings caused by conventional convergence assemblies, a technique has been employed to modify the deflection currents passing through the deflection windings by superimposing correction currents of the normal deflection currents in opposite senses in the two coil halves of the deflection-coil system, with the additional correction currents being a product of the instantaneous values of the vertical and horizontal deflection currents. This technique requires, however, a relatively complex driving circuit, and it is necessary to modulate the entire sweep current through the deflecting coils; so that a substantial amount of power is required to provide the correction current. Another disadvantage of this technique is that the turns location of the windings used for producing the correction field is fixed by the location of the deflection windings, and the number of turns and the size of the wires in the deflection windings is fixed; so that the correction currents produced are dependent on the configuration and characteristics of the deflection windings themselves.

As a consequence, it is desirable to provide for a system producing a correction field at the center of deflection utilizing a simple and efficient driving circuit. SUMMARY OF THE INVENTION Accordingly it is an object of this invention to provide an improved driving circuit for use with a deflection-correction system in a television receiver.

It is another object of this invention to provide a driving circuit for providing correction currents for a correction winding on the deflection yoke of a cathode-ray tube.

It is an additional object of this invention to provide a driving circuit for supplying a dynamic correction current to a correction winding on the deflection yoke of a cathode-ray tube.

In accordance with a preferred embodiment of this invention, a deflection yoke for a cathode-ray tube has a pair of deflection-coil systems, one of which deflects an electron beam in one direction and the other of which deflects the electron beam in an orthogonal direction in response to first and second deflection signals, respectively, In addition, a deflection-correction system is provided for the deflection yoke and is operated by a correction current from a source of voltage derived from one of the deflection signals and applied to the deflection correction system through a bidirectional switch, operated in response to the other of the deflection signals. As a consequence, a correction current is supplied to the correction system in the form of a current corresponding to the second deflection signal modulated by the first deflection signal.

DETAILED DESCRIPTION

Figure 1:
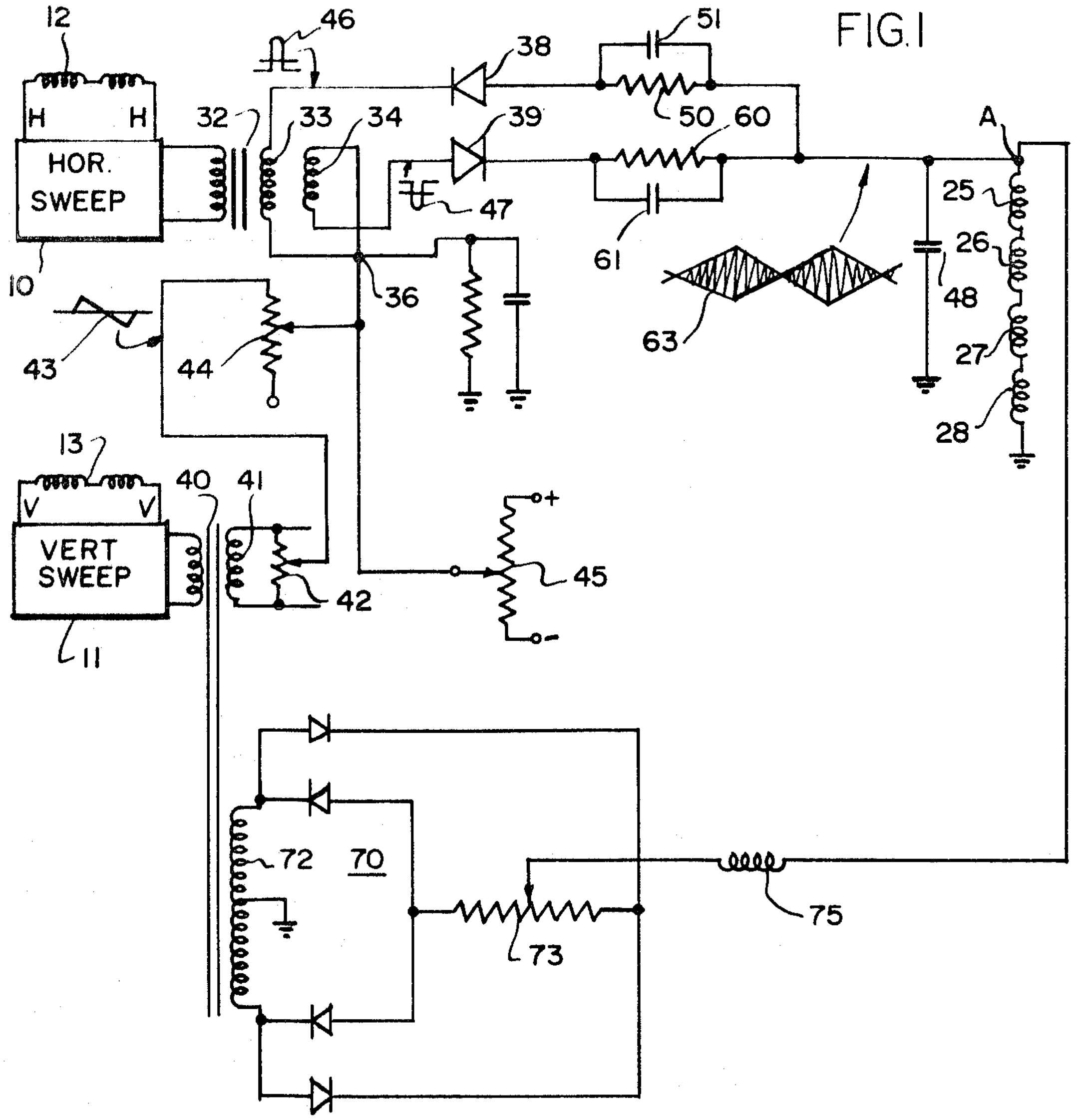
FIG. 1 is a schematic diagram of a correction circuit in accordance with a preferred embodiment of this invention.

Referring now to FIG. 1, there is shown a schematic diagram of a portion of the deflection system of a color television receiver employing a horizontal sweep or deflection circuit !0 and a vertical sweep or deflection circuit 11 for producing horizontal and vertical deflection signals in horizontal and vertical deflection windings 12 and 13. The windings 12 and 13 are wound on a toroidal deflection yoke 15 (FIG. 2), and the distribution of the turns of the horizontal and vertical windings on the yoke 15 are such as to provide a substantially uniform flux distribution within the toroid opening or center of the yoke 15. This winding turns distribution may be derived from a sinusoidal or cosine distribution of the turns of the windings as suggested in the patents to K. Schlesinger, U.S. Pat. No. 2,562,395, issued July 31, 1951, and No. 2,881,341, issued Apr. 7, 1959.

Figure 2:
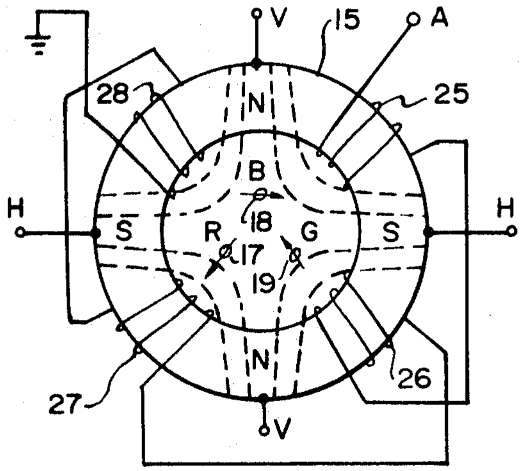
FIG. 2 illustrates a convergence yoke provided with a correction winding of the type supplied with signals by the circuit shown in FIG. 1.

The annular opening in the center of the toroid yoke 15 is of sufficient internal diameter to accommodate the neck of a conventional, shadow-mask, color cathode-ray tube having three electron guns producing three electron beams 17, 18, and 19 in an equilateral triangular configuration. The cathode-ray tube itself has not been shown in FIGS. 1 or 2 since it is conventional, and neither have other details of the color television receiver been shown, since they form no part of this invention and may be of any desired conventional configuration. In FIG. 2 the beams 17, 18, and 19 are indicated as being representative of the red, blue, and green fundamental colors, respectively, for exciting corresponding red, blue, and green triads on the display screen (not shown) of the shadow-mask, cathode-ray tube.

By providing the turns distribution of the horizontal and vertical deflection windings in a cosine distribution, a uniform deflection field is produced within the area of the tube traversed by the beams 17, 18, and 19; so that satisfactory convergence of the three beams, by their superimposition at the shadow-mask, is obtained along the central vertical and horizontal deflection axes of the deflection raster using the anastigmatic deflection yoke assembly 15 shown in FIG. 2. A yoke of this type, however, produces misconvergence of the beams at points not lying on the vertical and horizontal center axis of the raster, and it has been found that the misconvergence which is produced at the other points in the raster is a function of the instantaneous values of the horizontal and vertical deflection currents.

It further has been found that, if a correction field varying at the horizontal rate with a magnitude and polarity corresponding to the magnitude and polarity of the vertical deflection signal present during each horizontal scan is applied to the yoke 15, the misconvergence caused by the anastigmatic yoke can be corrected with a high degree of accuracy. To accomplish this, four correction windings 25, 26, 27, and 28 (FIG. 2) are wound on each of the four quadrants of the yoke 15 and are connected in series between ground and an input terminal A, which in turn is connected to the output of the convergence correction signal producing circuit shown in FIG. 1. The series-connected coils 25, 26, 27, and 28 are alternately wound in opposite directions to effectively operate as four magnets, with the poles of the magnets being indicated in FIG. 1 as including two North Poles, vertically oriented, and two South Poles, horizontally oriented, between the adjacent turns of the oppositely wound correction windings.

The magnetic poles shown in FIG. 2 are caused by a predetermined current, the direction and magnitude of which is chosen to cause a correction field to be applied to the three beams 17, 18, and 19 to move the beams in the directions of the vector arrows indicated in FIG. 2. The magnitude of the current flowing through the windings 25 to 28 determines the amount of movement in the directions shown, whereas the direction of the current flowing through the windings determines the direction of the vectors, that is, if the current flowing through the windings is reversed, the vector arrows shown in FIG. 2 also would be reversed.

Since the deflection current corrections windings 25 to 28 are wound over the deflecting coils, the center of the convergence correction field produced by the windings 25 to 28 is superimposed upon or coincides with the deflection center for the beams caused by the signals applied to the vertical and horizontal deflection windings. Because the turns of the deflection windings are cosine distributed on the yoke 15 to provide a uniform field in the yoke 15, the beam landings of three beams 17, 18 and 19 are not shifted by the correction convergence field obtained as a result of the current flowing through the windings 25, 26, 27, and 28. It will be understood that the direction of the correction current flowing through the windings 25, 26, 27, and 28 necessary to effect the convergence correction for the different quadrants of the raster must be reversed approximately midway through each horizontal trace or scan cycle and also must be reversed approximately midway through the vertical trace or scan cycle.

In order to provide the necessary convergence control current at the input terminal A connected to the convergence windings 25 to 28, a bidirectional switching circuit for supplying a potential varying at the vertical rate is connected to the input terminal A. This bidirectional switching circuit is shown in FIG. 1 and is controlled from the horizontal sweep transformer 32 which also is utilized to provide the deflection signals to the horizontal deflection windings 12 on the toroid deflection yoke 15. An additional pair of bifilar secondary windings 33 and 34 are connected together at one end at a common terminal 36 with the other ends of the windings 33 and 34 being coupled, respectively, to a pair of switching diodes 38 and 39. The polarity of the currents induced in the windings 33 and 34 is in the opposite sense, with the anode of the diode 39 being connected to the free end of the winding 34, and with the cathode of the diode 38 being connected to the corresponding end of the winding 33. The polarity of the diodes 38 and 39 is chosen such that during the trace interval of the horizontal sweep signal produced in the primary winding of the transformer 32, both of the diodes 38 and 39 are rendered forward-conductive for the entire trace interval.

During the retrace interval of the signal from the horizontal sweep circuit 10, a pair of opposite polarity pulses 40 and 41 are applied to the diodes 38 and 39, respectively, to render both of the diodes 38 and 39 nonconductive. Thus, the diodes 38 and 39 operate as a bidirectional switch between the terminal A and the common terminal 36, with the operation of the switch being at the horizontal sweep frequency.

The operating potential for producing the current supplied to the correction windings 25 to 28 is provided by a signal varying at the vertical sweep rate. As shown in FIG. 1, this operating potential is obtained from a secondary winding 41 on the vertical output transformer 40. The winding 41 may be the R/G vertical tilt winding, with the operating potential being taken from the tap of a potentiometer 42 connected across the winding 41 to produce a signal in the form of a sawtooth signal 43 varying at the vertical deflection rate. This signal is applied through a potentiometer 44 to the terminal 36 to modulate the horizontal signals applied to the secondary windings 33 and 34.

Since the rate at which the vertical deflection signal varies is considerably less than the horizontal-scanning frequency (60 Hz. as compared with the 15,750 Hz. horizontal frequency,) for any given horizontal trace or scan cycle, the vertical signal 43 appears to a substantially constant DC potential. The value of this DC potential is dependent upon the particular portion of the vertical sawtooth trace from which it is derived, and establishes the maximum amplitude and polarity of the horizontally varying scanning current applied through the bidirectional switch circuit to the terminal A, and the control windings 25 to 28.

Ideally, the anode of the diode 38 and the cathode of the diode 39 would be directly connected to the terminal A to provide a minimum impedance for the switch between the terminals A and 36. In actual practice, however, the potential developed in the bifilar windings 33 and 34, forming the circulating current to maintain the diode 38 and 39 conductive during the trace portion of the horizontal cycle, is sufficiently high to produce a current which would overheat and destroy the diodes 38 and 39. To prevent this from happening, current limiting resistors 50 and 60 are connected in series with each of the diodes 38 and 39, with each of these resistors being shunted by a capacitor 51 and 61, respectively. The capacitors 51 and 61 are charged by the circulating switching current passing through the diodes 38 and 39 to develop an opposing or countervoltage to the voltage induced in the windings 33 and 34, thereby maintaining the circulating current flow through the diodes 38 and 39 at a desirable low level while maintaining the diodes conductive during the trace interval of the horizontal signal.

Thus, whenever the diodes 38 and 39 are rendered conductive, they merely act to complete a circuit between the terminals 36 and A; so that the potential appearing on the terminal 36 is effectively coupled through the diode-switching circuit 38, 39 to terminal A. The magnitude and polarity of this potential depends upon the portion of the vertical sweep cycle that is present during the time that the diodes 38 and 39 are rendered conductive. The AC centerline of the vertical waveform 43 may be adjusted by adjusting the tap on a potentiometer 45 having the ends connected, respectively, to a source of positive and a source of negative DC-biasing potential. The movable tap of the potentiometer 45 is connected in common with the tap of the potentiometer 44 to the terminal 36. When the tap on the potentiometer 45 is connected to its midpoint, the AC centerline of the sawtooth waveform 43 is determined by the setting of the potentiometer 42 and preferably is symmetrical with respect to ground, as shown in the center line of the waveform 43 in FIG. 1. Thus, at the beginning of the vertical trace or scan, corresponding to the top of the raster on the screen of the cathode-ray tube, the vertical signal 43 is at a maximum positive potential relative to ground, and varies to a maximum negative potential for the bottom of the raster produced on the screen of the cathode-ray tube.

The correction coils 25 to 28 form a resonant circuit along with a capacitor 48, with a resonant frequency such that one-half cycle of the resonant frequency occurs during the time interval of the retrace pulses 46 and 47, which are applied to the diodes 38 and 39 to render them nonconductive during the retrace intervals of the horizontal signal. This causes the desired reversal of the magnetic field in the windings 25 to 28 during the retrace interval to initiate the next trace interval with a correction current direction which is opposite the direction of the current at the end of the horizontal trace interval.

The starting and finishing correction current directions depend upon the polarity of the modulating vertical sweep signal 43 applied to the terminal 36 for each given horizontal cycle. The diodes 38 and 39 merely operate as a bidirectional switch to permit current flow between the terminals 36 and A and the windings 25 to 28 in both directions in the same manner as the operation of a conventional horizontal-deflection system. The power supply for this correction system, however, changes both as to magnitude and polarity in accordance with the vertical sweep signal; so that the correction current appears substantially as a horizontal sweep signal modulated by the vertical sweep signal as indicated by the waveform 63.

As the vertical sweep voltage 43 approaches the AC centerline, the envelope modulating the horizontal signals becomes decreasing in amplitude as indicated by the waveform 63 applied to terminal A. Thus, when the vertical sweep circuit 11 causes the deflection of the electron beams 17, 18, and 19 to be substantially at the horizontal center of the raster on the screen of the cathode-ray tube, substantially no current flows in either direction through the correction windings 25 to 28. As the vertical trace or scan continues, the polarity of the signal 43 reverses with respect to ground; so that the polarity of the horizontally varying correction current applied to the correction windings 25 to 28 for the bottom half of the picture raster is reversed, with the magnitude of the modulating correction current envelope increasing to a maximum for the bottom most horizontal scan line in the raster produced by the vertical and horizontal sweep circuits. As a consequence, the electron beams 17, 18, and 19 are subjected to a continually varying amplitude of a convergence correction field, and the direction of this field is dependent on which of the four quadrants of the raster is being displayed.

In addition to the convergence correction which has been described thus far, a positive or negative DC-biasing voltage may be injected at the terminal 36 by changing the tap on the potentiometer 45 in order to change the amount of convergence correction at the top of the raster with respect to the bottom. This, in effect, moves the center line of the raster vertically in accordance with the polarity of the correction voltage which is added at the terminal 36, and in effect moves the AC centerline of the waveform 43 to accomplish this result.

The amount of convergence correction at the left side of the raster with respect to the right side may be adjusted by adding a DC-biasing potential at the terminal A, thereby in effect changing the symmetry of the waveform 63 to effect a greater or lesser convergence of the left side of the raster with respect to the right side thereof. A circuit for accomplishing this shift is in the form of a full-wave rectifier 70 which is provided with AC input signals from a secondary winding 72 on the vertical output transformer 40. The DC voltage produced by the rectifier 70 is applied across a potentiometer 73, with the variable tap on the potentiometer 73 providing a variable DC bias voltage through a coupling coil 75 to the terminal A. This DC-biasing voltage may be utilized in order to unbalance the correction currents and thus the amount of correction on the left and right sides of the raster produced by the deflection fields in the deflection yoke 15.

By using the circuit which has been described above to drive or supply current to the correction coils 25, 26, 27, 28, it is possible to provide correction of beam convergence in a three-beam cathode-ray tube without affecting the beam landings. Since the uniform field yoke 15 gives beam landings consistent with correction capabilities of lense designs, and the convergence correction coils 25 to 28 cause no shift in the beam landings as do conventional convergence assemblies, the purity guard band possibilities are substantially improved, and result in more tolerance for adjustment in production, or permit an increased brightness of the cathode-ray tube because the shadow-mask apertures can be made substantially larger (of the order of 40 percent larger.) The bidirectional switch is relatively simple in configuration; and may be readily added to a conventional television receiver circuit, with only minor modifications to the existing circuitry of the receiver.

I claim:

1. In a television receiver having a cathode-ray tube with a deflection yoke and a pair of deflection coil systems, one of which produces a deflection field which deflects an electron beam in a cathode-ray tube in one direction, and the other of which produces a deflection field which deflects the electron beam in the cathode-ray tube in a direction orthogonal to said one direction in response to first and second deflection signals respectively, the first and second deflection signals being of first and second frequencies, the deflection yoke further having a correction field-producing system for producing a correction field in response to correction control signals, said correction field being centered substantially at the center of the deflection fields produced by the deflection coil systems, a correction control-signal-producing circuit including in combination:

supply means responsive to said first deflection signal for providing a control potential varying in magnitude and polarity in accordance with said first deflection signal bidirectional current-conducting switch means coupled between said correction-field-producing system and the supply means; and means for operating the switch means in response to said second deflection signal at the frequency of the second deflection signal.

2. The combination according to claim 1 wherein the frequency of the first deflection signal is substantially lower than the frequency of the second deflection signal; so that the bidirectional switch means is operated in response to the second deflection signal a plurality of times during each cycle of the first deflection signal.

3. The combination according to claim 2 wherein the first deflection signal is a vertical deflection signal, with the control potential varying from a maximum magnitude at one polarity to a maximum magnitude at another polarity for each cycle of the vertical deflection signal, and wherein the second deflection signal is a horizontal deflection signal having trace and retrace portions with the switch-operating means causing the bidirectional switch means to be rendered conductive during the trace portions and to be rendered nonconductive during the retrace portions of each cycle of the horizontal deflection signal.

4. The combination according to claim 3 wherein the correction field producing system includes a correction field producing winding on the deflection yoke, the correction winding forming part of a resonant circuit having a resonant frequency such that one-half cycle thereof occurs during the retrace interval of the horizontal deflection signal, with the correction current passed by the bidirectional switch means corresponding to the horizontal deflection signal modulated by the vertical deflection signal, the amplitude and polarity of the correction current being dependent upon the amplitude and polarity of the vertical deflection signal at the time of each cycle of the horizontal deflection signal.

5. In a deflection system for a cathode-ray tube having a toroid deflection yoke with a pair of deflection coils wound thereon with a winding distribution to produce a uniform deflection field, one of the deflection coils being a horizontal deflection coil for deflecting electron beams in the cathode-ray tube in the horizontal direction and the other deflection coil being a vertical deflection coil for deflecting the beams in the cathode-ray tube in a substantially vertical direction in response to horizontal and vertical deflection signals, respectively, the deflection system further including an additional correction winding on the yoke for producing a correction field centered substantially at the center of the deflection fields produced by the deflection coils, a correction current supply circuit for providing a correction current to the correction winding including in combination:

means responsive to the vertical deflection signals for producing an input voltage corresponding to the amplitude and polarity of the vertical deflection signal;

bidirectional switch means coupled between the correction winding and the input-voltage-producing means; and means for controlling the operation of the bidirectional switch means in accordance with the horizontal deflection signals, the switch means being rendered conductive during trace intervals of the horizontal deflection signals and being rendered nonconductive during retrace intervals thereof.

6. The combination according to claim 5 wherein the horizontal deflection signal is produced by a circuit including a horizontal output transformer for providing the horizontal deflection signals to the horizontal deflection coil, the system further including first and second bifilar windings on the horizontal transformer and interconnected at one of the ends thereof, and wherein the switch means includes first and second diode means, with the first diode means being connected with the other end of the first bifilar winding and the second diode means being connected with the other end of the second bifilar winding, both diode means being connected with the correction-winding means, the diode means being oppositely poled with respect to the correction-winding means, and the bifilar windings being wound in such a manner as to render both of the diode means conductive simultaneously during the trace intervals of the horizontal deflection signals and to render both of the diode means nonconductive during the retrace intervals of the horizontal deflection signals, the input voltage being applied to the common terminal of the interconnected ends of the first and second bifilar windings.

7. The combination according to claim 6 further including current-limiting means connected in series with each of the diode means between the respective diode means and the correction winding means for limiting the circulating current through the diode means during the trace intervals of the horizontal deflection signal when the diode means are rendered conductive.

8. The combination according to claim 7 further including capacitor means connected across each of said current-limiting means.

9. The combination according to claim 7 further including means for applying a DC bias voltage to the interconnected first ends of the bifilar winding means.

10. The combination according to claim 7 further including means for providing a DC bias voltage to the correction-winding means at the connection with the diode means.

* * * * *